Figure 1:
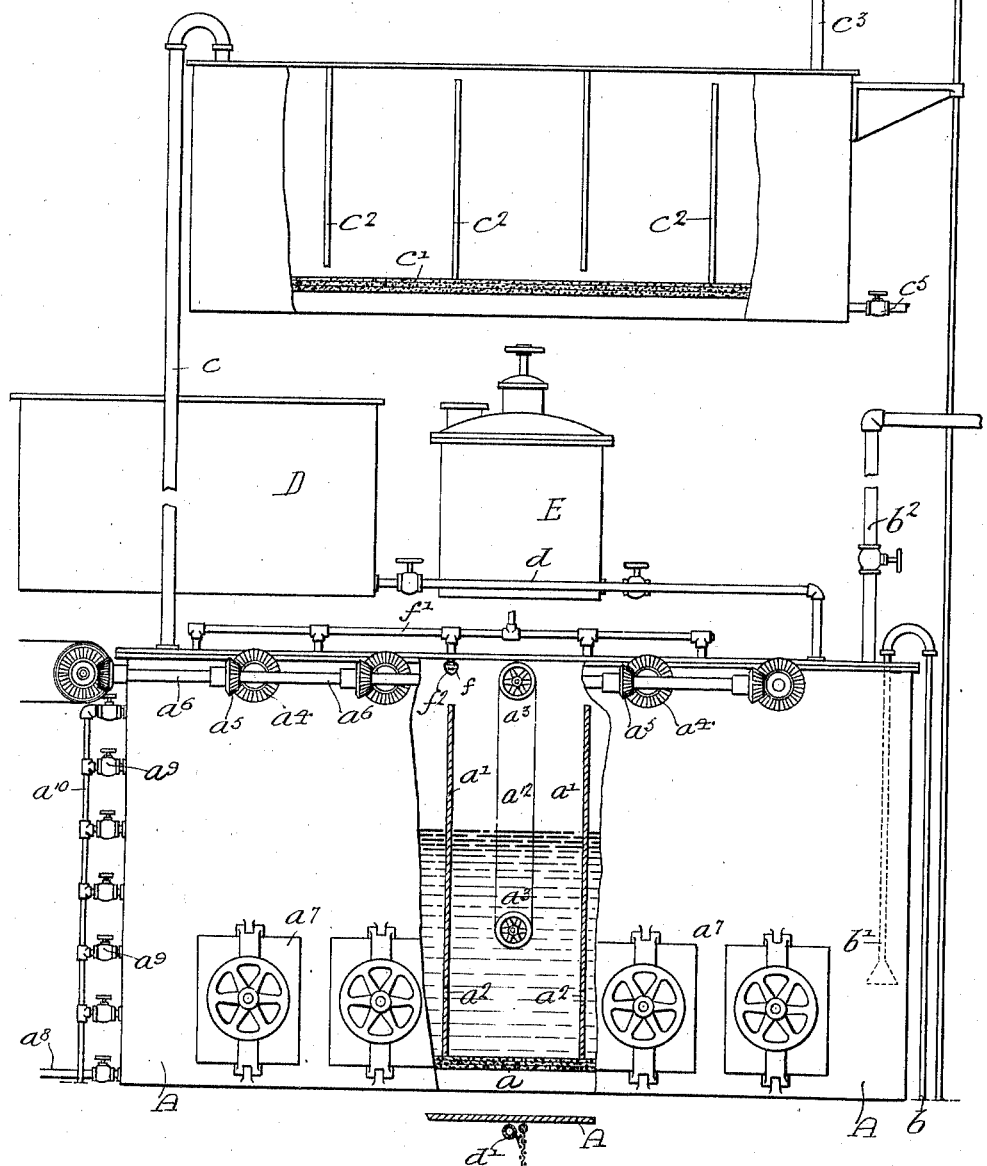

No. 820,884. PATENTED MAY 15, 1906.
S. T. MUFFLY.
APPARATUS FOR CONDENSING GASES.
APPLICATION FILED OCT. 6, 1905.

2 SHEETS—SHEET 1.

Witnesses:
Wills A. Burrowes
Titus H. Crous

Inventor.
Sidney T. Muffly
by his Attorneys
Howson & Howson

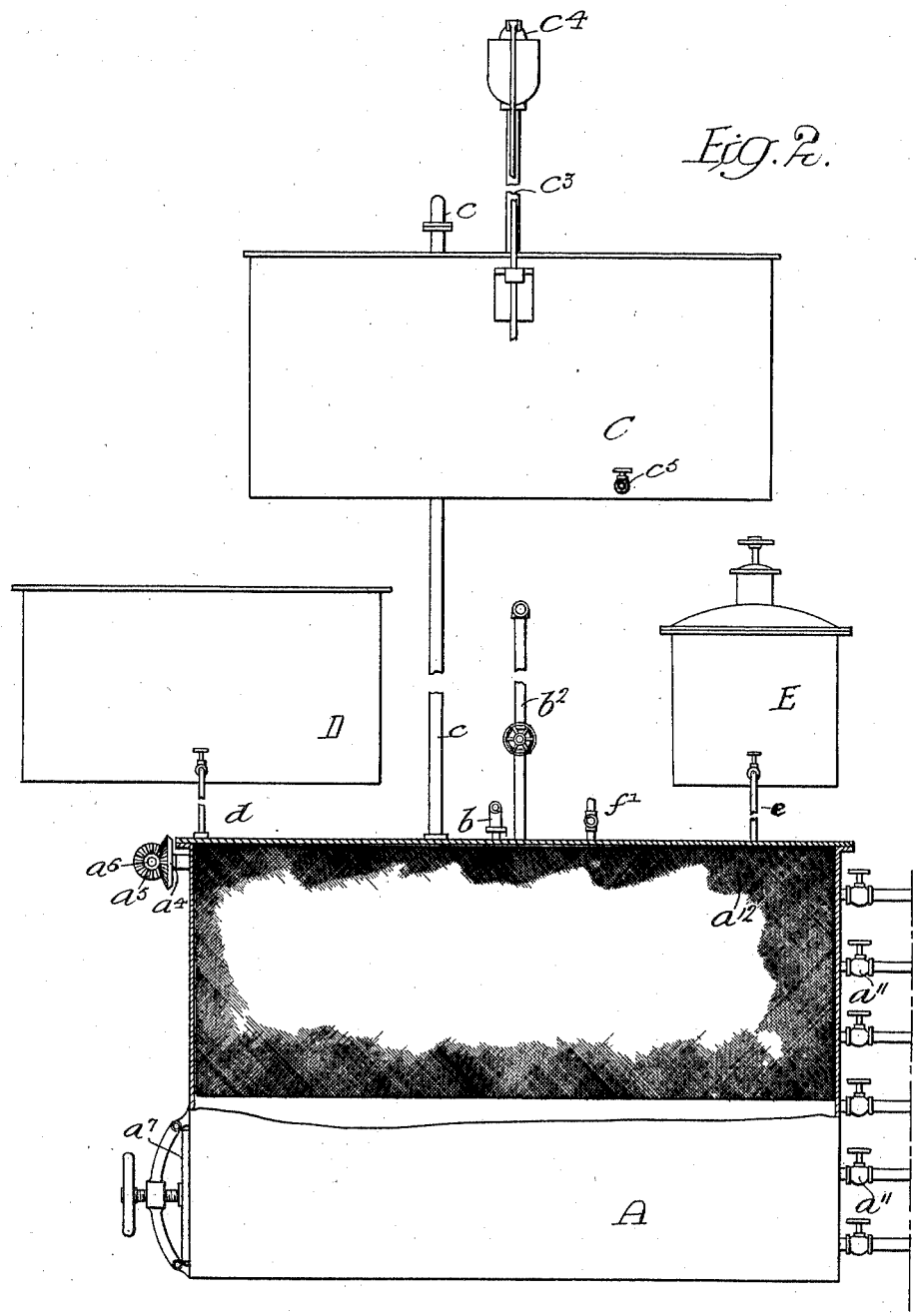

UNITED STATES PATENT OFFICE.

SIDNEY T. MUFFLY, OF PHILADELPHIA, PENNSYLVANIA, ASSIGNOR TO PHILADELPHIA CYANIDE PROCESS COMPANY, OF WILMINGTON, DELAWARE, AND PHILADELPHIA, PENNSYLVANIA, A CORPORATION OF DELAWARE.

APPARATUS FOR CONDENSING GASES.

No. 820,884.      Specification of Letters Patent.      Patented May 15, 1906.

Application filed October 6, 1905. Serial No. 281,673.

*To all whom it may concern:*

Be it known that I, SIDNEY T. MUFFLY, a citizen of the United States, residing in Philadelphia, Pennsylvania, have invented certain Improvements in Apparatus for Condensing Gases, of which the following is a specification.

One object of my invention is to provide an efficient, rapid, and relatively inexpensive combination of apparatus for dissolving gases or solid particles carried by gases in any desired solution, it being more paticularly desired to provide an apparatus having the characteristics above noted for recovering the hydrocyanic-acid gas given off during the operation of cyanid processes, and more particularly in connection with the process of extracting precious metals from their ores described and claimed by me in an application for United States patent, dated August 14, 1905, Serial No. 274,119.

I further desire to provide a combination of apparatus by which it shall be possible to recover the precious metals driven off as dust or volatilized during the roasting of complex ores or in connection with various smelting or refining processes, it being also desired that the apparatus shall be capable of use for the dissolving and precipitation of base metals and their gaseous compounds, as well as of the gases generated during the operation of the process described and claimed in my above-noted application for patent, as set forth in an application for United States patent, Serial No. 281,674, filed by me of even date herewith.

These objects I attain as hereinafter set forth, reference being had to the accompanying drawings, in which—

Figure 1 is an elevation, to some extent diagrammatic, of a combination of apparatus arranged according to my invention. Fig. 2 is an end elevation of the apparatus shown in Fig. 1, also illustrating in section further details of my invention; and Fig. 3 is a vertical section of a modified form of apron which may be used in carrying out my invention.

In the above drawings, A represents a chamber or casing of suitable form, having within it at some distance above its bottom a false floor or horizontal partition $a$, of filtering material, above which are a series of substantially vertical partitions $a'$, usually of wood, extending to within a short distance of the top of the casing or chamber A.

Slightly above the filter-bottom $a$ there are in the partitions a number of openings $a^2$ to permit of the free passage of liquid from one end of the casing to the other. Intermediate of each pair of partitions and, like them, extending the full width of the chamber A are a pair of rollers $a^3$, between which extends an endless apron $a^{12}$ of burlap, or other relatively porous fabric, the rollers being so arranged that while one of them is adjacent to the top of the chamber the other is supported in suitable bearings at some point below the predetermined level of the liquid, which under operating conditions is used in said chamber. The upper roller of each pair has fixed to its spindle a beveled gear $a^4$, and these beveled gears mesh with other gears $a^5$, carried upon a suitable shaft $a^6$ outside the chamber, which is designed to be driven from a source of power in any desired manner, so as to continuously turn the rollers $a^3$ and with them the aprons $a^{12}$.

The chamber A is provided with openings in one of its sides, respectively entering the spaces between each pair of partitions $a'$, these openings being closed by cover-plates $a^7$, held in position in any suitable manner. Gases, &c., may be delivered to the chamber either through a pipe $b$, having a funnel-shaped end $b'$ opening below the level of the surface of the liquid in the chamber, or from a pipe $b^2$, entering the top of said chamber. At the opposite end of the chamber from that at which said pipes $b$ and $b^2$ enter there is an outlet-pipe $c$, connected to an inclosed box C, having a false bottom $c'$, of filtering material, above which are a series of baffles $c^2$, designed to provide a tortuous passage from the point of entrance of the pipe $c$ to an outlet $c^3$ at the opposite end of the box, which outlet is provided with a valve $c^4$, positively actuated from time to time from any suitable source of power, whereby the air or gas under pressure within the box C is periodically allowed to escape.

The container D is provided for the solvent solution to be used in the apparatus, and this is connected, by means of a pipe $d$, to that end of the chamber A adjacent to the gas-inlet pipes $b$ and $b^2$. There is also provided a container E, connected to chamber A through a pipe $e$ for the ammonium or other alkaline hydrate to be used.

A suitable drain-pipe $a^3$ is provided for the space containing filtered liquid within the chamber A, which is also provided with a series of valved connections $a^9$, all communicating with a single outlet-pipe $a^{10}$, whereby the level of the liquid may be regulated. There is also, as shown in Fig. 2, a series of valved outlets $a^{11}$, whereby liquid may be drawn off from the chamber at any desired level for the purpose of testing.

I preferably provide at the top of the chamber A a series of conduits $f$, extending across the same and connected to a supply-pipe $f'$ outside of said chamber. In the lower faces of the pipes are slotted openings, and they are each provided with an internal deflector $f^2$, whereby the air under pressure is delivered at a uniform rate to all points of the chamber.

Under operating conditions the shaft $a^6$ causes the aprons $a^{12}$ to continuously enter and emerge from the solution within the chamber A, so that those portions of said aprons outside of the liquid carry a thin film of the solution. This latter, which is preferably a double cyanid of potassium and bromin, is supplied from the tank B, while the ammonium hydrate or other desired alkaline hydrate is supplied from the tanks D and E, respectively, the strength of the cyanid solution usually ranging from .1 to .5 of one per cent. The double cyanid itself is compounded in the proportion of five parts of potassium cyanid to one part of bromin cyanid. If now gas, vapors, or dust containing precious metals in finely-divided or volatilized form be passed into the chamber through pipe $b$, it will first be passed into the body of the liquid in the chamber A and then forced to pass through thin films of liquid carried by the fabric aprons $a^{12}$, as well as passed over the surface of said liquid. Such treatment very effectively and quickly causes the hydrocyanic-acid gas, as well as the metallic particles or compounds, to be dissolved in the cyanid solution, particularly since any precipitates formed on the aprons are almost immediately deposited in the main body of liquid in the chamber, while the base-metal compounds formed at the same time are at once precipitated as hydrates by the action of the alkaline hydrate delivered from the container E.

I have found that the reactions taking place are favored and hastened by the direct downward action of the air under pressure upon the surface of the body of liquid, as well as on the films of the same, and it will be seen that from time to time said air passes out from the chamber A through the pipe $c$ into the box C, thereby being passed in contact with the baffle-plates $c^2$ and caused to deposit any liquid still carried by it in the form of vapor. It is finally permitted to periodically escape through the pipe $c^3$ and valve $c^4$. The liquid so deposited in the box C passes through filter-partition $c'$ and may be drawn off through the outlet-pipe $c^5$. As solid material collects within the chamber A the liquid may be drawn off and the covers $a^8$ removed to permit of the collection and removal of the precipitates or slimes, which may then be treated to recover their valuable constituents.

If desired, stationary aprons $a^{13}$ may be substituted and used, as shown in Fig. 3, and in such case a pipe $d'$, having a series of perforations and extending across the chamber A, would be connected to chamber D for the purpose of providing relatively thin films of liquid in which the gases, &c., would be dissolved.

I claim as my invention—

1. In apparatus for condensing or dissolving gases or the like, the combination of a closed chamber having an inlet and containing a body of liquid, a series of substantially vertical, endless aprons extending across the chamber, partitions extending upward from the bottom of the chamber to points adjacent to the top thereof and respectively between successive aprons, with means for supporting and longitudinally moving said aprons to cause them to enter and emerge from the body of liquid in the chamber, substantially as described.

2. In apparatus for condensing or dissolving gases or the like, the combination of a closed chamber containing a body of liquid, a series of substantially vertical and endless aprons extending downwardly into the body of liquid in said chamber, means for longitudinally moving the aprons to cause them to enter and emerge from the body of liquid, with partitions extending across the chamber from the bottom to points adjacent to the top thereof and respectively placed between successive aprons, there being openings through the partitions below the level of the liquid to permit of the circulation of liquid, substantially as described.

3. In apparatus for condensing or dissolving gases or the like, the combination of a closed chamber, a series of substantially vertical aprons in said chamber, means for supplying liquid to the surfaces of the aprons, with partitions extending across the chamber and respectively placed between successive aprons, there being openings through the partitions to permit of the passage of liquid, and said casing having a false bottom of filtering material placed to form a space for the filtered liquid, there being an outlet to said space, substantially as described.

4. In apparatus for condensing or dissolving gases or the like, the combination of a closed chamber having an inlet and an outlet for gases, &c., to be dissolved or condensed, a series of aprons in the chamber, means for supplying said aprons with solvent liquid, and means for supplying air to the chamber so that it exerts a direct downward pressure upon liquid in the same greater than that of the atmosphere, substantially as described.

5. In apparatus for condensing or dissolving liquid or the like, the combination of a closed chamber having an inlet and an outlet for gases, &c., to be dissolved or condensed, a series of aprons in the chamber, means for supplying air to the chamber so that it exerts a direct downward pressure upon liquid in the same greater than that of the atmosphere, a closed box having a series of baffle-plates and connected to said chamber, with an automatic outlet-valve for said box having means whereby it is periodically actuated to permit of escape of air, substantially as described.

In testimony whereof I have signed my name to this specification in the presence of two subscribing witnesses.

SIDNEY T. MUFFLY.

Witnesses:
    WALTER CHISM,
    JOS. H. KLEIN.